(12) United States Patent
Kuo et al.

(10) Patent No.: US 8,928,840 B2
(45) Date of Patent: Jan. 6, 2015

(54) LCD MODULE AND LCD DEVICE

(75) Inventors: Yicheng Kuo, Shenzhen (CN);
Shihhsiang Chen, Shenzhen (CN);
Gang Yu, Shenzhen (CN); Gege Zhou, Shenzhen (CN); Jiaqiang Wang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 185 days.

(21) Appl. No.: 13/512,731

(22) PCT Filed: Apr. 24, 2012

(86) PCT No.: PCT/CN2012/074569
§ 371 (c)(1),
(2), (4) Date: May 30, 2012

(87) PCT Pub. No.: WO2013/152527
PCT Pub. Date: Oct. 17, 2013

(65) Prior Publication Data
US 2013/0271692 A1    Oct. 17, 2013

(30) Foreign Application Priority Data
Apr. 13, 2012   (CN) .......................... 2012 1 0108852

(51) Int. Cl.
*G02F 1/1335* (2006.01)
(52) U.S. Cl.
USPC .............................................. 349/64; 349/95
(58) Field of Classification Search
CPC ........ G02F 2001/133314; G02F 2001/133322; G02F 2201/503
USPC ................................... 349/60, 57, 95, 112, 64
See application file for complete search history.

(56) References Cited

U.S. PATENT DOCUMENTS 6,891,580 B2 * 5/2005 Jang et al. ........................ 349/58
7,130,004 B2 * 10/2006 Kela et al. ........................ 349/58
(Continued)

FOREIGN PATENT DOCUMENTS

CN            201047895 Y       4/2008
CN            101699141 A       4/2010
(Continued)

OTHER PUBLICATIONS

Wu Riwen, The International Searching Authority written comments, Jan. 2013, CN.

*Primary Examiner* — Edward Glick
*Assistant Examiner* — Mark Teets
(74) *Attorney, Agent, or Firm* — IPro, Inc.; Na Xu

(57) ABSTRACT

The invention provides an LCD module and an LCD device. The LCD module includes a backlight module, and an LCD panel arranged above the backlight module; the backlight module includes a backplane, and an optical film(s); a side wall(s) of the backplane is provided with a limit structure which is integrated with the backplane, and the edge of the LCD panel is butted on the limit structure. In the invention, because the corresponding limit structure is arranged on the side wall of the backplane to limit the degree of freedom of the LCD panel in the plane direction of the panel surface, the rubber frame is not required to limit the degree of freedom of the LCD panel in the plane direction of the panel surface; thus, the structure of the rubber frame is simplified, the material of the rubber frame is saved, and the processing cost is saved.

2 Claims, 5 Drawing Sheets

(56) References Cited

U.S. PATENT DOCUMENTS

| | | | |
|---|---|---|---|
| 7,439,553 B2 * | 10/2008 | Fukayama et al. | 257/98 |
| 7,495,717 B2 * | 2/2009 | You et al. | 349/64 |
| 2012/0063113 A1 * | 3/2012 | Hisakawa et al. | 361/807 |
| 2014/0111743 A1 * | 4/2014 | Takemura et al. | 349/64 |

FOREIGN PATENT DOCUMENTS

| | | |
|---|---|---|
| CN | 101713885 A | 5/2010 |
| CN | 201926846 U | 8/2011 |
| CN | 102368122 A | 3/2012 |

* cited by examiner

LCD MODULE AND LCD DEVICE

TECHNICAL FIELD

The invention relates to the field of liquid crystal displays (LCDs), and more particularly to an LCD module and an LCD device.

BACKGROUND

LCD devices, with low power consumption and small volume, are more and more popular. However, with the development of LCD technology, some existing problems are discovered.

FIG. 1 shows a structure of a conventional LCD module for an LCD device. The structure of the LCD module is connected by a rubber frame 25, to enable an LCD panel 10 and a backlight module 20 to be assembled together so as to achieve the normal operation of the LCD device. The LCD panel 10 is positioned on the uppermost part and supported by a support part 251 of the rubber frame 25, and optical films are pressed below the rubber frame 25. The optical films include a first optical film 22, a second optical film 23, and a third optical film 24. The edge of the LCD panel 10 is also butted by the rubber frame 25; thus, the LCD panel 10 is fixed on the LCD module. With the acceleration of market competition, it is necessary to better control the cost and optimize the structure in the case of sales profit reduction; thus, the structure of the LCD device is continuously optimized and simplified, to achieve the aim of reducing cost.

SUMMARY

In view of the above-described problems, the aim of the invention is to provide a low-cost LCD module and an LCD device.

The aim of the invention is achieved by the following technical scheme.

An LCD module comprises a backlight module, and an LCD panel arranged above the backlight module; the backlight module comprises a backplane, and optical films; a side wall(s) of the backplane is provided with a lug boss which is integrated with the backplane and inwards bent, and the lug boss is sheathed with a buffer sleeve; the edge of the LCD panel is butted on the lug boss; the edge(s) of the optical film is provided with a folded edge(s), and the LCD panel is arranged on the folded edges.

The aim of the invention is further achieved by another technical scheme.

An LCD module comprises a backlight module, and an LCD panel arranged above the backlight module; the backlight module comprises a backplane, and optical films; a side wall(s) of the backplane is provided with a limit structure which is integrated with the backplane, and the edge of the LCD panel is butted on the limit structure.

Preferably, the limit structure is a lug boss which is arranged on the side wall of the backplane and is inwards bent. The lug boss which is inwards bent is formed by directly processing on the side wall of the backplane with a simple manufacturing method without adding members.

Preferably, the limit structure is a spacer layer arranged on the inner side surface of the side wall of the backplane. Thus, the processing degree to the backplane is slightly reduced, and then the strength of the backplane is prevented from being weakened; meanwhile, the spacer layer is made of elastic material, and then no buffer spacers are required to be arranged.

Preferably, the limit structure is sheathed with a buffer sleeve, thereby preventing the LCD panel from being damaged when the limit structure is butted with the LCD panel.

Preferably, a buffer spacer is arranged on the surface of the limit structure butted with the LCD panel, thereby preventing the LCD panel from being damaged when the limit structure is butted with the LCD panel.

Preferably, the edge(s) of the optical film is provided with a folded edge(s), and the LCD panel is arranged on the folded edges. Because the optical film of the LCD module is provided with folded edge(s), the LCD panel is arranged on the folded edges, and the side wall of the backplane is provided with a corresponding limit structure to limit the degree of freedom of the LCD panel in the plane direction of the panel surface, the LCD panel is not required to be supported by a rubber frame(s), and the rubber frame(s) is not required to limit the degree of freedom of the LCD panel in the plane direction of the panel surface; thus, the rubber frame as a component is not needed by the backlight module, and the material cost of the rubber frame is saved. Meanwhile, the frame of the LCD device is narrowed because the rubber frame is omitted, and the design of narrow frame is further achieved. In addition, because the LCD panel is supported by the folded edges arranged on the optical film, no interval is reserved between the folded edges, and only a slight gap is reserved between the LCD panel and the optical films in a visible area; thus, even the outer side of the LCD panel is not provided with rubber frame(s), light leakage is not easily generated because of the design of the black matrix on the LCD panel. Furthermore, because no interval is reserved between the edges of the LCD panel and the folded edges for support, namely the length of the folded edge is at least more than that of the edge of the LCD panel, all the edges of the LCD panel are continuously supported instead of only supporting the four corners by the separated rubber frames, thereby increasing the compression strength of the LCD panel, effectively preventing the black matrix or other structure(s) from moving because of oversize deformation when being stressed, and preventing light leakage and water ripple phenomena.

Preferably, the optical films comprise a first optical film positioned on the bottom layer, a second optical film positioned on the middle layer, and a third optical film positioned on the uppermost layer; the folded edges are formed by folding the edges of the third optical film to the upper surface of thereof. The folded edges are formed by folding the optical film itself, facilitating the operation during assembly.

Preferably, the optical films comprise a first optical film positioned on the bottom layer, a second optical film positioned on the middle layer, and a third optical film positioned on the uppermost layer; the folded edges are formed by folding the edges of the first optical film to the upper surface of the third optical film. Thus, the second and third optical films can be positioned by the first optical film on the bottom layer.

Preferably, the folded edges are thin sheets which are stuck on the optical film and separated from the optical film, thereby favoring the processing of the optical films without cutting the conventional optical films or changing the process thereof.

An LCD device comprises an LCD module mentioned above.

In the invention, because the corresponding limit structure is arranged on the side wall of the backplane to limit the degree of freedom of the LCD panel in the plane direction of the panel surface, the rubber frame(s) is not required to limit the degree of freedom of the LCD panel in the plane direction of the panel surface. Thus, the structure of the rubber frame(s)

is simplified, the material cost of the rubber frame(s) is saved, and the processing cost is saved. Furthermore, the LCD panel can also be supported by other modes such as arranging support structure(s) on the optical films at the bottom of the LCD panel or directly arranging the LCD panel on the optical films; thus, the rubber frame as a component of the backlight module can be omitted, thereby further saving the material cost. Under the circumstances of possibly omitting the rubber frame, the aim of the narrow frame of the LCD device can be easily achieved.

Legends: 10. LCD panel; 20. backlight module; 21. light guide panel (LGP); 22. first optical film; 23. second optical film; 24. third optical film; 25. rubber frame; 26. outer frame; 27. backplane; 77. gap; 271. lug boss; 272. buffer sleeve; 273. buffer spacer; 274. spacer layer; 241. folded edge; 242. pre-folded edge; 243. pre-folded line; 251. support part.

DETAILED DESCRIPTION

The invention will further be described in detail in accordance with the figures and the preferable examples.

Figure 1:
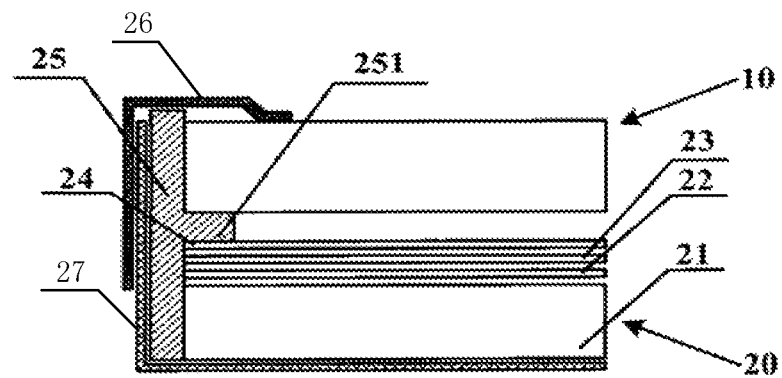
FIG. 1 is a simplified structure diagram of a conventional LCD module.
Figure 2:
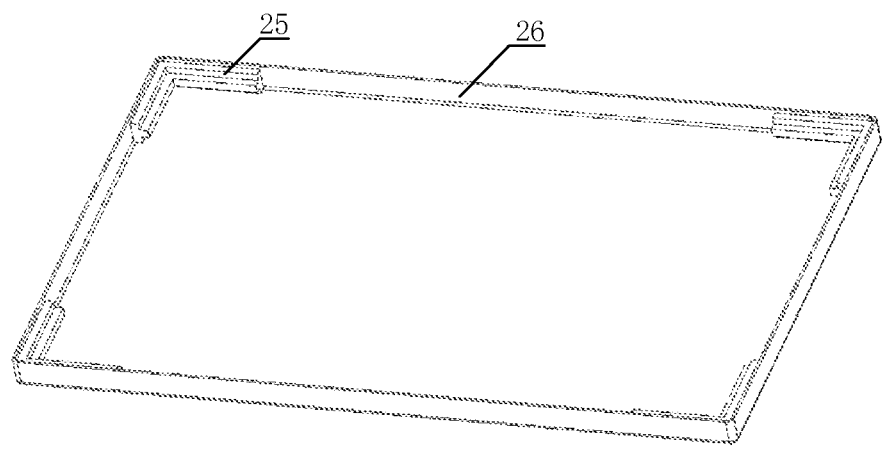
FIG. 2 is a simplified structure diagram of a separated rubber frame(s) of a conventional LCD module.

As shown in FIG. 2, the inventor has tried to use the following scheme to reduce material and processing cost: as shown in the Figure, in the LCD module, the four corners of the LCD panel are respectively supported by four separated rubber frames 25. The LCD module assembled through such structure has a problem, namely because the interval exists between the separated rubber frames 25, the LCD panel is downwards bent when being stressed, the black matrix on the LCD panel is moved, light leakage is generated, and then water ripple is generated; thus, the image quality of the LCD device is seriously affected. In addition, for the separated rubber frames 25, the interval between the four separated rubber frames 25 positioned on the LCD panel is too large, resulting in an excessive gap between the LCD panel and the optical films, and then resulting in light leakage; thus, the optical quality of the whole module is seriously affected.

The specific scheme of the invention will further be described in detail in accordance with the specific examples.

Figure 3:
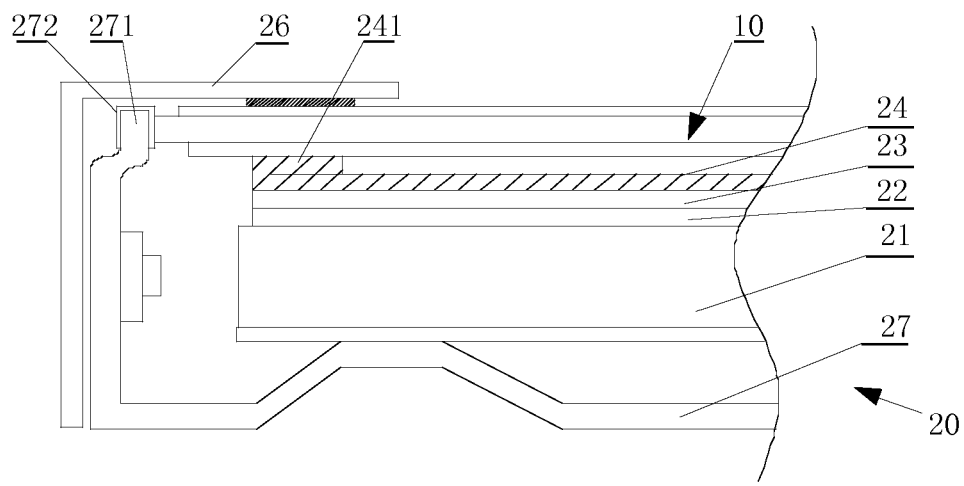
FIG. 3 is a simplified structure diagram of an LCD module of an example of the invention.
Figure 4:
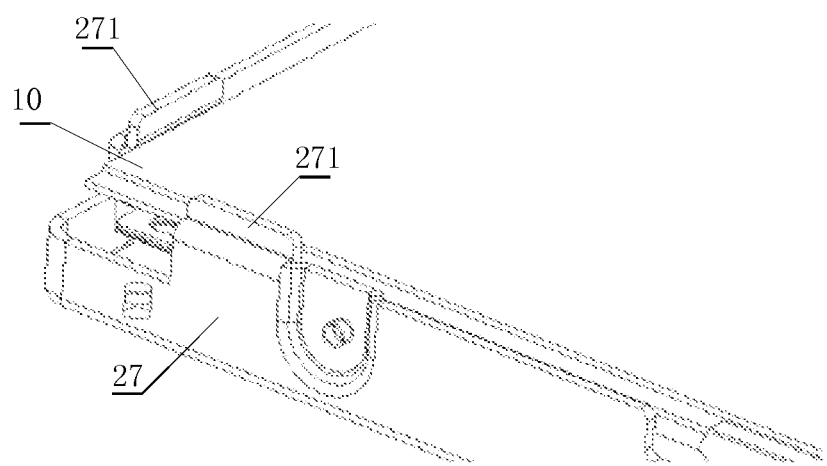
FIG. 4 is a simplified assembly diagram of a backplane and an LCD panel of an example of the invention.
Figure 5:
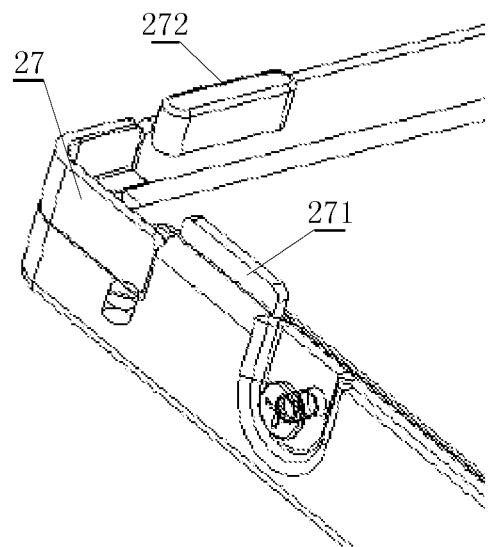
FIG. 5 is a simplified structure diagram of a first backplane of an example of the invention.
Figure 7:
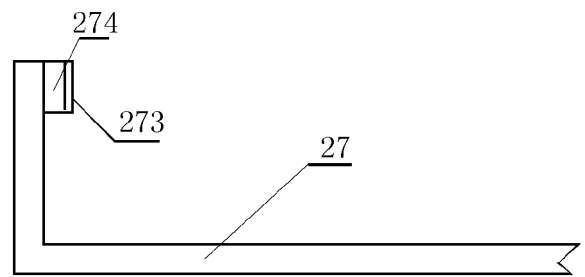
FIG. 7 is a simplified structure diagram of a third backplane of an example of the invention.

FIG. 3 shows an LCD module of the LCD device of the invention, comprising a backlight module 20, and an LCD panel 10; the backlight module 10 comprises a backplane 27, an LGP 21 arranged in the backplane 27, a first optical film 22, a second optical film 23 and a third optical film 24 which are arranged on the light emitting surface of the LGP 21, and outer frame(s) 26 arranged on the periphery of the backplane 27; folded edges 241 are arranged on the upper surface at the edges of the third optical film 25 of the uppermost layer of the optical films of the backlight module 20, the LCD panel 10 is arranged on the folded edges of the third optical film 24, and the LCD panel 10 is supported by the folded edges 241. Preferably, the width of the folded edge is outside the effective active area of the LCD panel 10, to avoid affecting the normal display of the LCD panel 10. As shown in FIG. 4 and FIG. 5, a side wall(s) of the backplane 27 is provided with a lug boss 271 which is bent to the inside of the backlight module, and the edges of the LCD panel 10 are butted with the lug bosses 271; thus, the degree of freedom of the LCD panel 10 in the plane direction of the panel surface is limited by the lug bosses 271 on the side wall of the backplane 27. Optionally, in addition to arranging the lug boss 271 as a limit structure for limiting the edge of the LCD panel 10, the inner side of the side wall of the backplane 27 shown in FIG. 7 is additionally provided with a spacer layer 274 as a limit structure attached to the side wall of the backplane 27.

Because the folded edges 241 are arranged on the optical films of the LCD module, the LCD panel 10 is arranged on the folded edges 241, and the side wall of the backplane is provided with the corresponding limit structure to limit the degree of freedom of the LCD panel 10 in the plane direction of the panel surface, the LCD panel is not required to be supported by the rubber frame(s), and the rubber frame is not required to limit the degree of freedom of the LCD panel 10 in the plane direction of the panel surface; thus, the rubber frame as a component is not needed by the backlight module 20, and the material cost of the rubber frame is saved. Furthermore, the frame of the LCD device is narrowed because the rubber frame is omitted, and the design of narrow frame is further achieved. In addition, because the folded edges 241 arranged on the optical films are used for supporting the LCD panel 10, no interval is reserved between the edges of the LCD panel 10 and the folded edges of the optical films, thereby avoiding light leakage of the LCD device because the LCD panel is supported by the separated rubber frames. Moreover, because no interval is reserved between the edges of the LCD panel 10 and the folded edges 241 for support, namely the length of the folded edge is at least more than that of the edge of the LCD panel, all the edges of the LCD panel are continuously supported instead of supporting the four corners by the separated rubber frames, thereby increasing the compression strength of the LCD panel 10, effectively preventing the black matrix or other structure(s) from moving because of oversize deformation when being stressed, and preventing light leakage and water ripple phenomena.

Figure 6:
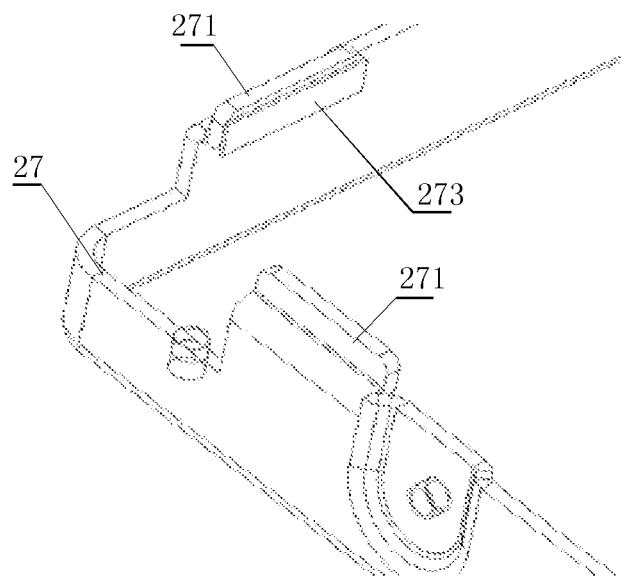
FIG. 6 is a simplified structure diagram of a second backplane of an example of the invention.

As shown in FIG. 5, to avoid damaging the LCD panel when the lug boss 271 is butted with the LCD panel, the lug boss 271 is sheathed with a buffer sleeve 272 which is made of elastic material; or as shown in FIG. 6, the butting surface of the lug boss 271 is provided with a buffer spacer 273 which is made of elastic material, to further protect the safety of the LCD panel. In addition, for the scheme shown in FIG. 7, the spacer layer 274 can be directly made of elastic material, and then the buffer spacer 273 is not required to be arranged.

Figure 8:
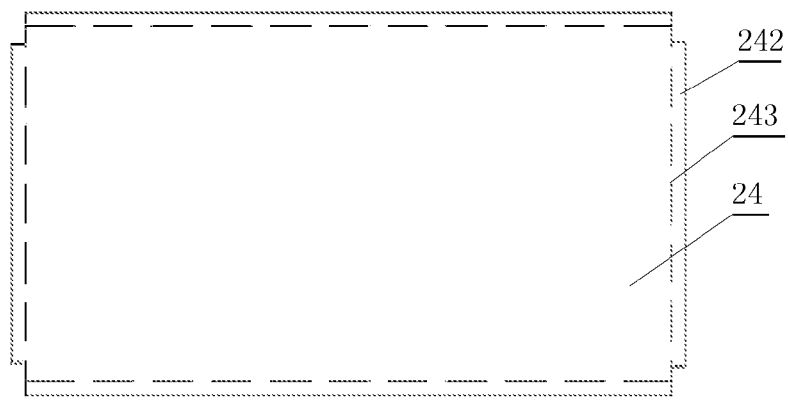
FIG. 8 is a process diagram of an optical film of an example of the invention.

As mentioned above, in the invention, the LCD panel 10 is supported by the folded edges on the optical film. In the example of the invention, the optical films comprise a first optical film 22 positioned on the bottom layer, a second optical film 23 positioned on the middle layer, and a third optical film 24 positioned on the uppermost layer; the folded edges 241 are arranged on the third optical film 241 FIG. 8 and FIG. 9 respectively show a manufacturing method and a structure of the third optical film 24. As shown in FIG. 8, a pre-folded edge 242 which is integrated with the third optical film 24 is arranged at the edge of the third optical film 24, and a pre-folded line 243 is arranged between the folded edge 242 and the body of the third optical film 24; the pre-folded line 243 can be a discontinuous crack arranged at the edge of the third optical film 24, and can be an impression as well, thereby facilitating folding the pre-folded edge 242 to form the folded edge 241 shown in FIG. 9.

Optionally, a pre-folded edge separated from the third optical film is additionally arranged, namely a thin sheet is additionally arranged, and the pre-folded edge (thin sheet) is attached to the third optical film by sticking or other modes to form the folded edge. Thus, the folded edge can be formed on the conventional optical film standardly processed without changing too much processing technology of the optical film, thereby saving the production cost.

Figure 9:
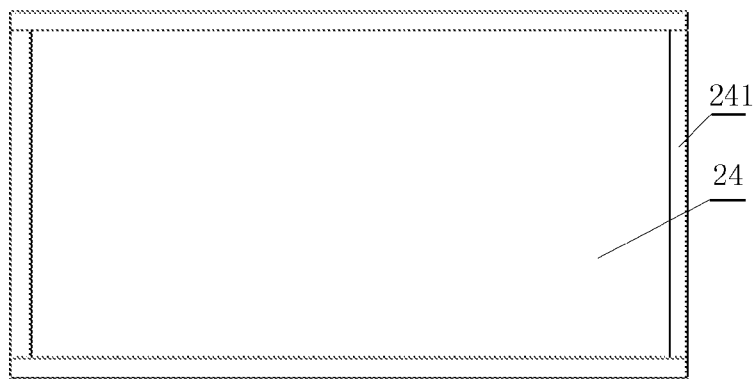
FIG. 9 is a simplified structural diagram of an optical film of an example of the invention.
Figure 10:
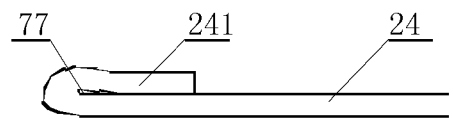
FIG. 10 is a schematic diagram of a third optical film when being folded of an example of the invention.
Figure 11:
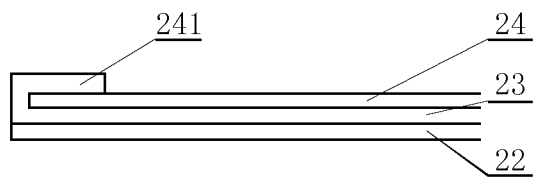
FIG. 11 is a simplified structure diagram of another optical film of an example of the invention.
Figure 12:
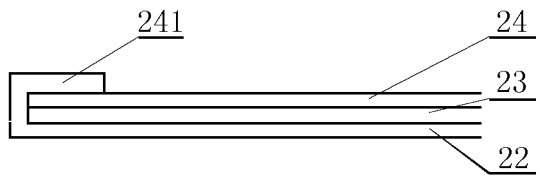
FIG. 12 is a simplified structure diagram of a third optical film of an example of the invention.

As shown in FIG. 8, the pre-folded edges 242 are folded to the upper surface of the third optical film 24 to form the folded edges 241 shown in FIG. 9. However, because the pre-folded edges are folded instead of being broken, a certain gap 77 near the pre-folded line 243 is reserved between the folded edge 241 and the third optical film 24 to enable this place to be slightly protruded (as shown in FIG. 10). To avoid generating such situation, as shown in FIG. 11, the second optical film 23 is folded to the upper surface of the third optical film 24 to form the folded edges 241; therefore, no protrusion occurs in the folding position. Optionally, as shown in FIG. 12, the first optical film 22 is folded to the upper surface of the third optical film 24 to form the folded edges 241 to enable the first optical film 22 to wrap the second optical film 23 and the third optical film 24, so as to play a role of positioning the second optical film 23 and the third optical film 24.

In addition, for the invention, the LCD panel is directly arranged on the optical films as well, namely the folded edges are not required to be arranged to support the LCD panel. Thus, the support structure is directly omitted, namely the rubber frame as a component is omitted, and even the folded edge is omitted; alternatively, only the structure of the support part of the rubber frame is made, thereby simplifying the structure of the rubber frame, and then reducing the production cost of the rubber frame.

The invention is described in detail in accordance with the above contents with the specific preferred examples. However, this invention is not limited to the specific examples. For the ordinary technical personnel of the technical field of the invention, on the premise of keeping the conception of the invention, the technical personnel can also make simple deductions or replacements, and all of which should be considered to belong to the protection scope of the invention.

We claim:

1. An LCD module, comprising: a backlight module, and an LCD panel arranged above said backlight module; wherein said backlight module comprises a backplane, and an optical film(s); a side wall(s) of said backplane is provided with a limit structure which is integrated with said backplane, and a side wall of the edge of said LCD panel is butted on said limit structure, wherein the edge of said optical film is provided with a folded edge, the folded edge(s) is turned up and directly contacts a part of an upper surface of said optical film(s), and said LCD panel presses on said folded edge(s) without interval between the LCD panel and said folded edge(s), wherein said optical film comprises a first optical film positioned as the bottom layer, a second optical film positioned as the middle layer, and a third optical film positioned as the uppermost layer, an upper surface of said third optical film is the upper surface of said optical film; said folded edges are formed by folding the edges of said first optical film to the upper surface of said third optical film, and the folded edges of said first optical film directly contact the upper surface of said third optical film.

2. An LCD device, comprising: a backlight module, and an LCD panel arranged above said backlight module; wherein said backlight module comprises a backplane, and an optical film(s); a side wall(s) of said backplane is provided with a limit structure which is integrated with said backplane, and a side wall of the edge of said LCD panel is butted on said limit structure, wherein the edge of said optical film is provided with a folded edge the folded edge(s) is turned up and directly contacts a part of an upper surface of said optical film(s), and said LCD panel presses on said folded edge(s) without interval between the LCD panel and said folded edge(s), wherein said optical films comprise a first optical film positioned as the bottom layer, a second optical film positioned as the middle layer, and a third optical film positioned as the uppermost layer, an upper surface of said third optical film is the upper surface of said optical film; said folded edges are formed by folding the edges of said first optical film to the upper surface of said third optical film, and the folded edges of said first optical film directly contact the upper surface of said third optical film.

* * * * *